United States Patent

[11] 3,631,778

[72] Inventors: Joachim Von Albedyll, Augsburg; Karl Wagner, Ottobrunn; Hans-Peter Huber, Munich, all of Germany
[21] Appl. No. 870,019
[22] Filed Oct. 28, 1969
[45] Patented Jan. 4, 1972
[73] Assignee Agfa-Gevaert Aktiengesellschaft Leverkusen, Germany
[32] Priority Oct. 31, 1968
[33] Germany
[31] P 18 06 484.1

[54] AUTOMATIC PHOTOGRAPHIC APPARATUS FOR A CAMERA
10 Claims, 6 Drawing Figs.
[52] U.S. Cl. .................................................. 95/10 CE, 95/64 C
[51] Int. Cl. .................................................. G03b 7/08, G03b 7/16
[50] Field of Search ........................................ 95/10 C, 11.5, 64 R, 64 C, 53 R, 53 E, 10 CE, 10 CT, 10 CD

[56] References Cited
UNITED STATES PATENTS

| | | | |
|---|---|---|---|
| 3,063,354 | 11/1962 | Matulik et al. | 95/53 EL X |
| 3,283,681 | 11/1966 | Singer et al. | 95/10 C |
| 3,326,103 | 6/1967 | Topaz | 95/11.5 |
| 3,422,738 | 1/1969 | Mori et al. | 95/10 C |
| 3,504,601 | 4/1970 | Schubert | 95/10 C |
| 3,504,602 | 4/1970 | Kiper | 95/10 C |
| 3,504,604 | 4/1970 | Kitai | 95/10 C |
| 3,505,938 | 4/1970 | Zobel et al. | 95/64 A X |
| 3,522,763 | 8/1970 | Dietz | 95/10 C |

Primary Examiner—Joseph F. Peters
Attorney—Michael S. Striker

ABSTRACT: A photographic camera wherein the needle of the light meter is scanned to serve as a means for determining the setting of the shutter and diaphragm units during operation in daylight. A resistor which is variable by the focusing member of the camera is connected in circuit with the light meter when the camera is used for operation in artificial light. The connection of the variable resistor into the light meter circuit, in addition to or as a substitute for a photosensitive receiver, can take place in response to attachment of a source of artificial light or automatically when the intensity of scene light is below a predetermined value.

INVENTOR.
JOACHIM v. ALBEDYLL
KARL WAGNER
HANS-PETER HUBER

INVENTOR.
JOACHIM v. ALBEDYLL
KARL WAGNER
HANS-PETER HUBER

INVENTOR.

JOACHIM v. ALBEDYLL
KARL WAGNER
HANS-PETER HUBER

BY

Michael S. Striker
Attorney

AUTOMATIC PHOTOGRAPHIC APPARATUS FOR A CAMERA

BACKGROUND OF THE INVENTION

The present invention relates to photographic apparatus for use in daylight and artificial light. More particularly, the invention relates to improvements in photographic apparatus wherein shutter unit and/or the diaphragm unit is adjusted automatically as a function of scene brightness during operation in daylight, and wherein at least one of these units is automatically adjusted when the apparatus is used with a multiple flashbulb holder, an electronic flash or another built-in or separable source of artificial light. Still more particularly, the invention relates to improvements in cameras wherein the exposure value or values can be influenced by the focusing means during operation in artificial light.

SUMMARY OF THE INVENTION

An object of the invention is to provide a photographic apparatus wherein the exposure control is automatically adjusted in response to setting for operation in daylight or artificial light and wherein the exposure values for operation in artificial light are automatically selected in a way to insure the making of satisfactory exposures at several distances from the subject.

Another object of the invention is to provide an exposure control whose setting is altered automatically when the intensity of scene light rises above or decreases below a predetermined value.

A further object of the invention is to provide a novel electric circuit for the exposure controls of cameras which are to be used in daylight or artificial light.

The invention is embodied in a photographic apparatus which is designed for use in daylight or artificial light. The apparatus comprises adjustable diaphragm and shutter units, light meter means having output means movable between a plurality of positions, adjusting means providing an operative connection between the light meter means and at least one of the units to adjust the latter as a function of the position of the output means, variable resistor means, focusing means movable between a plurality of positions each of which is indicative of a different distance from the subject and being arranged to adjust the resistor means as a function of its selected position, and an electric circuit arrangement which includes the light meter means and further includes photosensitive receiver means in circuit with the light meter means to determine the position of the output means as a function of the intensity of scene light, at least when the apparatus is used in daylight. The circuit arrangement further includes an auxiliary circuit having switchover means operable to move from a first to a second position in which the resistor means is respectively disconnected from and in circuit with the light meter means, and operating means for operating the switchover means, at least when the intensity of scene light is below a predetermined value, so that the resistor means then influences the position of the output means.

The operating means may include the foot or another portion of a source of artificial light which causes the switchover means to change its position in response to movement of such portion to an operative position in which the apparatus can make an exposure with flash. Alternatively, the operating means may include second photosensitive receiver means and electromagnet means whose condition of energization is changed when the intensity of scene light to which the second receiver means is exposed is below the predetermined value whereby the electromagnet means effects the aforementioned change in position of the switchover means. The latter preferably includes a two-way switch.

In accordance with another feature of the invention, the resistance of the variable resistor means (or of further resistor means which is connectable in the circuit of the light meter means together with the variable resistor means) can be selected in such a way that it is indicative of the guide number of the source of artificial light which is to be used with the apparatus.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
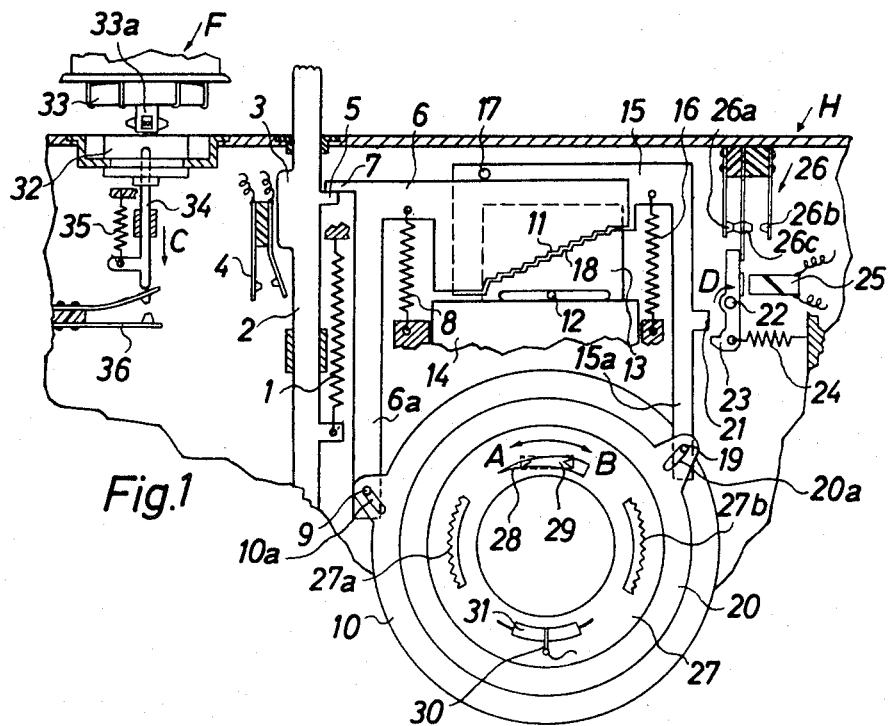
FIG. 1 is a fragmentary schematic longitudinal vertical sectional view of a still camera which embodies one form of the invention.

FIG. 1 illustrates a portion of a still camera having a housing H accommodating a reciprocal camera release 2 biased by a return spring 1. The release 2 is a slide which is provided with an actuating portion or trip 3 serving to close a normally open electric switch 4. Still further, the release 2 comprises a projection or lug 5 which normally engages an arm 7 provided on a scanning member 6. The latter is biased by a spring 8 which is weaker than the spring 1 and tends to move the scanning member 6 downwardly, as viewed in FIG. 1. A pin 9 on a downwardly extending elongated arm 6a of the scanning member 6 is received in a slot 10a provided in a ring-shaped setting member 10 of the adjustable diaphragm unit. The scanning member 6 is provided with a serrated scanning face 11 which can engage the output member or needle 12 of a light meter 13. The needle 12 is turnable or reciprocal along a back support or anvil 14. When the release 2 moves downwardly, the spring 8 is free to contract so as to move the scanning face 11 into engagement with the needle 12 and to press the latter against the back support 14. The position of the scanning member 6, and hence the position of the setting member 10 is then a function of the position of the needle 12.

The camera further comprises a second scanning member 15 which is biased downwardly by a helical spring 16 and has a follower post 17 which bears against the upper edge of the scanning member 6. The second scanning member 15 is provided with a serrated scanning face 18 and its downwardly extending elongated arm 15a carries a pin 19 extending into a slot 20a provided in the ring-shaped setting member 20 of an adjustable shutter unit. The arm 15a has a projection 21 which can be engaged by the pallet of a blocking lever 23 pivotable on a fixed pin 22 and biased by a spring 24 which tends to move the pallet away from engagement with the projection 21. The blocking lever 23 constitutes the armature of an electromagnet 25 which is energizable to thereby move the lever into engagement with the projection 21. The upper arm of the lever 23 constitutes an actuating member or trip for the median contact 26c of a switchover device here shown as a two-way switch 26 whose fixed contacts 26a, 26b flank the movable contact 26c.

The camera also comprises a ring-shaped focusing member 27 having two manually engageable milled or knurled portions 27a, 27b which enable the operator to rotate the focusing member in directions indicated by the double-headed arrow A-B. The focusing member 27 has a masking portion formed with a tapering slot 28 which is movable in front of a fixedly mounted photosensitive receiver 29. The focusing member 27 further includes a slider 30 which constitutes the movable part of a variable resistor 31.

The top wall of the housing H supports an indexible socket 32 for the base 33 of a source of artificial light here shown as a multiple flashbulb holder F, preferably the one commonly known as Flashcube. A plunger 34 extends into the socket 32 from below and is depressed when the plug 33a of the base 33 is properly introduced so that the holder F is indexible with the socket. The direction in which the plunger 34 is moved in response to attachment of the holder F is indicated by the arrow C. A helical spring 35 biases the plunger 34 upwardly; when the holder F is attached to the socket 32, the lower end of the plunger 34 closes a normally open switch 36.

Figure 2:
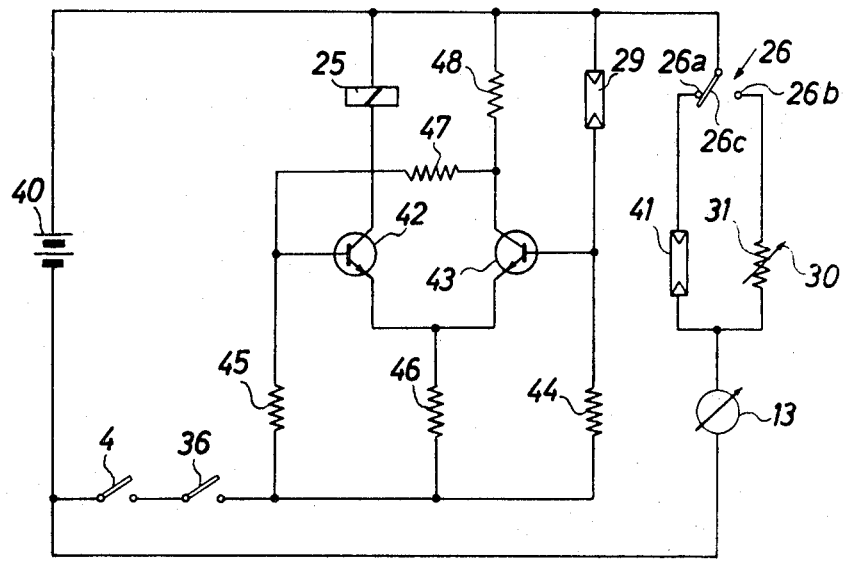
FIG. 2 is a diagram of the electric circuit arrangement in the camera of FIG. 1.

The circuit arrangement of the camera of FIG. 1 is illustrated in FIG. 2. The circuit arrangement includes a battery 40 or another suitable energy source. The two-way switch 26 can connect the battery 40 with a second photosensitive receiver 41 or with the aforementioned variable resistor 31 whose resistance is variable by the focusing member 27. Thus, the angular position of the needle 12 of the light meter 13 is either a function of the resistance of the photosensitive receiver 41 or a function of the resistance of the variable resistor 31. If the switches 4 and 36 are closed, the battery 40 is connected in circuit with an auxiliary circuit which includes the electromagnet 25, the photosensitive receiver 29, as well as two transistors 42, 43 and the associated fixed resistors 45, 46, 47 and 48. The parts 42, 43, 45, 46, 47 form a switching circuit which is controlled by a voltage divider including the aforementioned photosensitive receiver 29 and a fixed resistor 44. The collector circuit of the transistor 42 contains the electromagnet 25 for the blocking lever 23.

The scanning members 6 and 10 constitute an adjusting device which establishes an operative connection between the diaphragm unit (setting member 10) and shutter unit (setting member 20) on the one hand, and the light meter 13 on the other hand so that the two units are adjusted as a function of the position of the needle 12 when the camera is used in daylight.

The Operation:

If the user wishes to make an exposure with flash at a time when the scene brightness is rather high, the holder F is attached to the socket 32 so that the plunger 34 closes the switch 36. Since the photosensitive receiver 41 is in circuit with the light meter 13, the angular position of the needle 12 is indicative of the scene brightness. The user then depresses the release 2 so that the trip 3 closes the switch 4 and the latter connects the auxiliary circuit including the transistors 42, 43 and the resistors 45–48 with the battery 40. If the scene brightness is such that the resistance of the second photosensitive receiver 41 exceeds a predetermined value, the auxiliary circuit prevents energization of the electromagnet 25 so that the scanning members 6, 15 respectively adjust the diaphragm unit and the shutter unit as a function of scene brightness which is indicated by the position of the needle 12, i.e., as a function of the resistance of the photosensitive receiver 41. The flashbulb which faces the subject is fired on opening of the shutter unit; such opening can be effected by the release 2 in response to movement to its lower end position. Light issuing from the fired flashbulb serves to effect additional illumination of the subject.

If the exposure is made when the intensity of scene light is below a predetermined value, the resistance of the receiver 29 is rather high and the potential at the base of the transistor 43 suffices to change the condition of the auxiliary circuit so that the latter permits energization of the electromagnet 25 when the user closes the switch 4 while the socket 32 accommodates the base 33 of a multiple flashbulb holder F. The energized electromagnet 25 pivots the blocking lever 23 whereby the latter's pallet pivots in the direction indicated by an arrow D and intercepts the projection 21 to thus insure that the setting member 20 selects an exposure time which is acceptable for exposures with flash. At the time, the upper arm of the lever 23 moves the contact 26c of the two-way switch 26 against the fixed contact 26b so that the receiver 41 is disconnected. The light meter 13 is then connected in series with the variable resistor 31. Thus, the angular position of the needle 12 is a function of the selected resistance of the resistor 31, i.e., a function of the position of the focusing member 27. The lever 23 does not interfere with downward movement of the scanning member 6 so that the setting member 10 selects an aperture size which is a function of the distance from the subject. As mentioned above, the second scanning member 15 can descend only to the extent permitted by the pallet of the lever 23 which then extends into the path of movement of the projection 21.

The provision of the tapering slot 28 in front of the photosensitive receiver 29 constitutes an advantageous feature of the just described camera. The masking portion which is formed with this slot is movable in front of the receiver 29 in dependency on the selected position of the focusing member 27, i.e., as a function of the distance from the subject. When the camera is moved closer to the subject, the amount of light issuing from the flashbulb in response to firing prevails over the remaining light so that it is desirable to fire the bulb earlier when the distance between the camera and the subject is less. The slot 28 reduces the amount of scene light which reaches the receiver 29 in response to rotation of the focusing member 27 in a direction which is indicative of a reduced distance from the subject so that the switching circuit can react earlier.

The electromagnet 25 and the photosensitive receiver 29 constitute an operating means in the auxiliary circuit of the arrangement shown in FIG. 2, and such operating means serves to change the position of the switchover device (two-way switch 26) when the intensity of scene light is below a predetermined value whereby the switch 26 connects the variable resistor 31 in circuit with the light meter 13 so that the resistor 31 influences the position of the needle 12 in dependency on selected position of the focusing member 27.

The electromagnet 25 can be replaced by two discrete electromagnets one of which is energizable to pivot the lever 23 and the other of which is energizable to change the position of the movable contact 26c in the two-way switch 26.

The resistance of the variable resistor 31 is indicative of the guide number of the multiple flashbulb holder.

Figure 3:
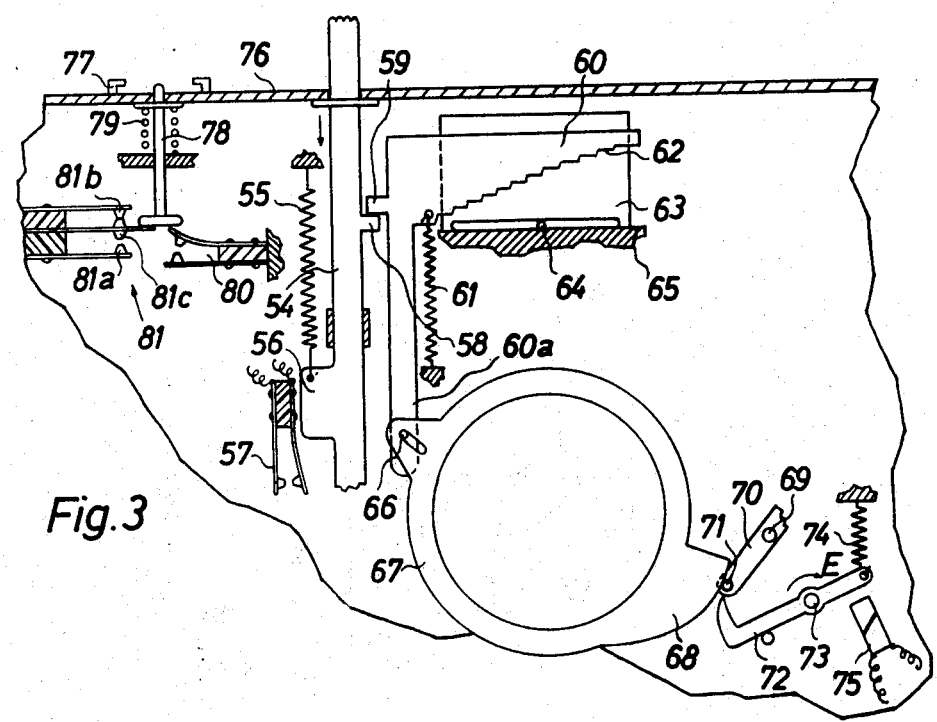
FIG. 3 is a fragmentary schematic longitudinal vertical sectional view of a second still camera.

In the camera of FIG. 3, the release 54 is biased by a return spring 55 which tends to maintain the release in the illustrated starting position. The release 54 is provided with a trip 56 which can close a normally open switch 57 and with a projection or lug 58 cooperating with the arm 59 of a scanning member 60 having a serrated scanning face 62. A helical spring 61 biases the scanning member 60 downwardly, as viewed in FIG. 3, so that the arm 59 bears against the projection 58 when the release 54 assumes the illustrated starting position. The light meter is shown at 63 and its output member or needle at 64. The latter is movable along a back support 65. An elongated downwardly extending arm 60a of the scanning member 60 is provided with a pin 66 extending into a slot provided in a ring-shaped setting member 67 of the diaphragm and shutter units. The setting member 67 is provided with a cam 68 which is tracked by a pin-shaped follower 71 provided on a lever 70 which is pivotable on a pin 69. The lever 70 directly controls the retard mechanism (not shown) of the shutter unit. A portion of the face on the cam 68 is preferably designed in such a way that, when this portion is engaged by the follower pin 71 and the setting member 67 rotates in response to displacement of the scanning member 60, the angular position of the lever 70 remains unchanged. Thus, the angular position of the setting member 67 must be changed to a predetermined extent before the lever 70 begins to adjust the retard mechanism. A blocking member 72, here shown as a two-armed lever, is pivotable on a pin 73 and is biased by a helical spring 74. This blocking lever 72 constitutes the armature of an electromagnet 75 and turns in the direction indicated by arrow E when the electromagnet is energized. Such energization of the electromagnet 75 enables the blocking lever 72 to prevent movements of the lever 70. The aforementioned configuration of the first portion of the face on the cam 68 enables the blocking lever 72 to intercept the lever 70 before the latter can change the setting of the retard mechanism during initial rotation of the setting member 67, i.e., immediately after closing of the switch 57.

The housing 76 of the photographic camera shown in FIG. 3 carries an accessory shoe 77 which can receive the foot (not shown) of an electronic flash unit whereby the foot depresses a plunger 78 which is biased into the space between the rails of the shoe 77 by a helical spring 79. Depression of the plunger 78 in response to attachment of an electronic flash results in closing of a normally open switch 80 and causes the movable median contact 81c of a two-way switch 81 to move away from a first fixed contact 81b and to engage a second fixed contact 81a.

Figure 4:
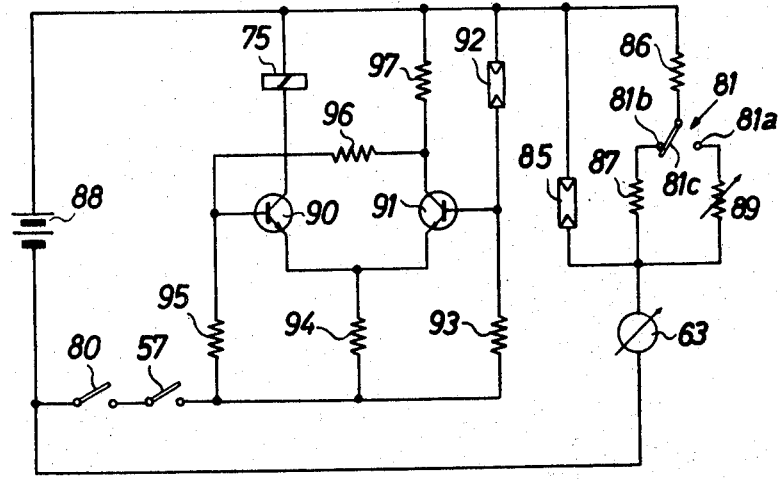
FIG. 4 is a diagram of the electric circuit arrangement in the camera of FIG. 3.

The electric circuit arrangement of the camera shown in FIG. 3 is illustrated in FIG. 4. It comprises a battery 88 and a photosensitive receiver 85 which is in series with the battery 88 and with the light meter 63. During operation in daylight, the position of the needle 64 of the light meter 63 is a function of the resistance of the receiver 85 which is exposed to scene light. This receiver 85 is then connected in parallel with series-connected fixed corrective resistors 86, 87. When the camera is set for operation with flash, the resistor 87 is replaced with a variable resistor 89 through the intermediary of the two-way switch 81 wherein the movable contact 81c then engages the contact 81a. The variable resistor 89 is then in series with the resistor 86.

The auxiliary circuit of the circuit arrangement shown in FIG. 4 comprises two transistors 90, 91 controlled by a voltage divider including a second photosensitive receiver 92 and a fixed resistor 93. The center tap of the voltage divider is connected with the base of the transistor 91. The emitters of the transistors 90, 91 are connected to a common emitter resistor 94. The auxiliary circuit further includes fixed resistors 95, 96 and 97. The electromagnet 75 is connected in the collector circuit of the transistor 90.

The Operation:

To make an exposure, the user depresses the release 54 in the direction indicated by arrow. If the shoe 77 is empty, the auxiliary circuit including the transistors 90, 91 is open because the switch 80 is open and the angular position of the needle 64 is then a function of the resistance of the photosensitive receiver 85, i.e., the exposure time and the aperture size are selected strictly as a function of scene brightness. As the release 54 moves downwardly, the spring 61 is free to contract and the scanning member 60 travels toward the back support 65 until its scanning face 62 engages the needle 64. The setting member 67 rotates in a counterclockwise direction until the face 62 reaches the needle 64. The lever 70 adjusts the retard mechanism of the shutter unit to the extent determined by the position of the face on the cam 68 with reference to the follower 71 when the scanning member 60 terminates its movement under the action of the spring 61. The setting member 67 further adjusts the diaphragm unit so that not only the exposure time but also the aperture size is a function of scene brightness when the camera is used in daylight.

If the user inserts the foot of a flash into the shoe 77, the plunger 78 moves downwardly and closes the switch 80 by simultaneously changing the position of the two-way switch 81 so that the latter disconnects the resistor 87 and connects the resistor 86 in series with the variable resistor 89. The resistor 89 is adjustable by the focusing member (not shown), preferably in the same way as described in connection with the focusing member 27 and resistor 31 of FIG. 1.

Since the switch 57 closes in response to depression of the release 54, the auxiliary circuit including the transistors 90, 91 is completed because the plunger 78 holds the switch 80 in closed position. If the intensity of scene light is low, the resistance of the receiver 92 is high and the potential at the base of the transistor 91 suffices to effect a change in the condition of the auxiliary circuit so that the electromagnet 75 is energized and pivots the blocking lever 72 against the opposition of the spring 74 (arrow E in FIG. 3) whereby the pallet of the blocking lever 72 intercepts the follower 71 or another part of the lever 70 and prevents a change in adjustment of the retard mechanism. Thus, the cam 68 cannot influence the setting of the shutter unit; this shutter unit then assumes a position in which it can furnish an optimum time for making of an exposure with artificial illumination of the subject.

The setting member 67 then merely adjusts the diaphragm in dependency on the selected distance from the subject (variable resistor 89).

FIG. 4 shows that the photosensitive receiver 85 remains in the circuit at all times, i.e., also when the exposure is made with artificial illumination of the subject. Consequently, the aperture size for operation with flash is selected not only as a function of the distance from the subject (resistor 89) but also as a function of the intensity of scene light prior to firing of the flash. The purpose of the resistor 87 is to insure that the conditions influencing the light meter 63 during operation in daylight are equivalent or substantially equivalent to conditions during operation with flash.

When the camera of FIGS. 3 and 4 is used with a source of artificial light, the photosensitive resistor 85 influences the setting of the diaphragm unit as a function of the lightness or darkness of the area surrounding the subject. The variable resistor 89 influences the setting of the diaphragm unit as a function of the position of the focusing member.

The plunger 78 of FIG. 3 can be said to form part of the source of artificial light. When permitted to assume the illustrated inoperative position, the plunger 78 maintains the switchover means (two-way switch 81) in a first position in which the variable resistor 89 is disconnected from the light meter 63. When the push rod 78 is caused to assume its operative position (in response to insertion of a foot into the accessory shoe 77), the plunger changes the position of the two-way switch 81 to thereby connect the resistor 89 in circuit with the light meter 63, i.e., in parallel with the photosensitive receiver 85.

Figure 5:
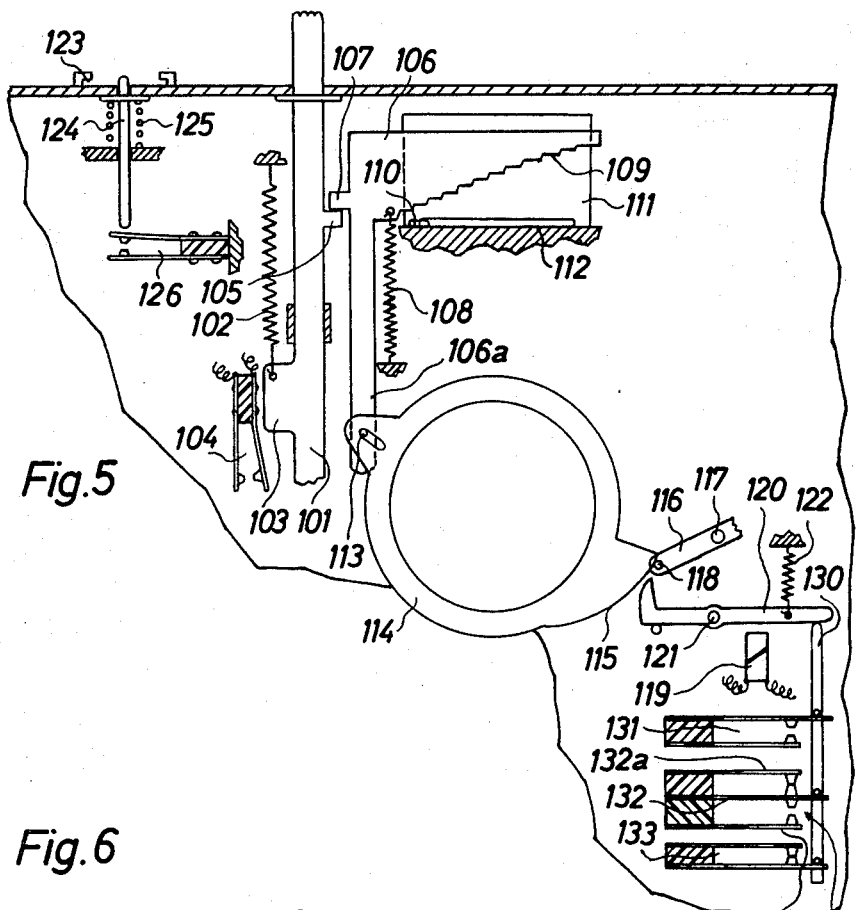
FIG. 5 is a fragmentary schematic longitudinal vertical sectional view of a third camera.

The mechanical details of the camera shown in FIG. 5 are quite similar to those of the camera shown in FIG. 3. The release 101 is biased upwardly by a strong return spring 102 and carries a trip 103 which can close a normally open switch 104. A projection 105 of the release 101 cooperates with an arm 107 of a reciprocable scanning member 106 which is biased downwardly by a helical spring 108 and has a serrated scanning face 109. The light meter 111 has an output member or needle 110 which can be engaged by the face 109 and urged against a back support 112. An elongated arm 106a of the scanning member 106 is provided with a pin 113 extending into the slot of a ring-shaped setting member 114. The latter is provided with a cam 115 tracked by the follower pin 118 of a two-armed lever 116 which is fulcrumed at 117 and adjusts the retard mechanism (not shown) of the shutter unit. The foremost or outermost part of the face on the cam 115 has a curvature whose center is located on the axis of the setting member 114 so that the follower 118 does not pivot the lever 116 during the initial stage of rotation of the member 114 from its starting position. A blocking lever 120 is pivotable on a pin 121 and is biased to inoperative position by a helical spring 122. The lever 120 constitutes the armature of an electromagnet 119 which is energizable to move the pallet of the lever into the blocking engagement with the follower 118. The lever 120 then displaces a push rod 130 which can actuate a battery of switches 131, 132, 133. When the electromagnet 119 is deenergized, the switch 131 is open, the switch 133 is closed, and the movable contact 132c of the switch 132 engages the upper fixed contact 132a. On energization of the electromagnet 119, the lever 120 causes the push rod 130 to close the switch 131, to open the switch 133, and to move the movable contact 132c into engagement with the other fixed contact 132b of the switch 132.

The top wall of the housing of the camera shown in FIG. 5 carries an accessory shoe 123 which normally accommodates the tip of a plunger 124 biased upwardly by a helical spring 125. The lower end of the plunger 124 closes a normally open switch 126 when the shoe 123 receives the foot of a flash unit.

Figure 6:
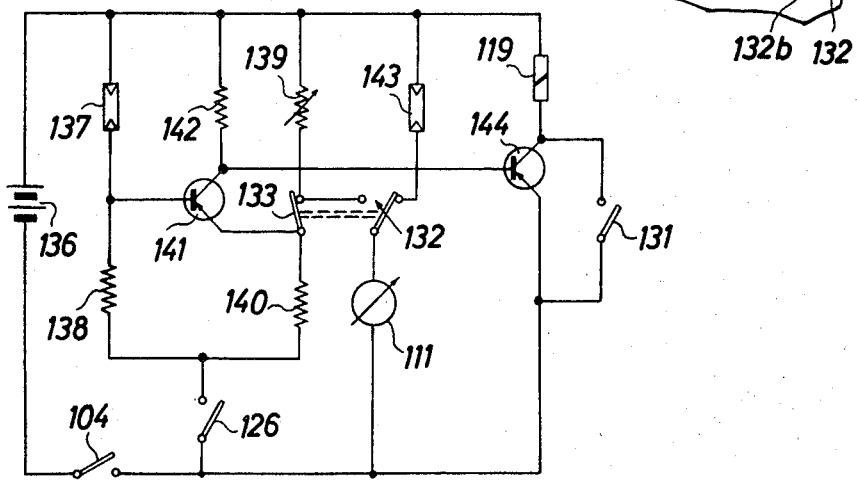
FIG. 6 is a diagram of the electric circuit arrangement in the camera of FIG. 5.

The circuit arrangement of the just-described camera is illustrated in FIG. 6. This circuit arrangement includes a battery or an analogous source 136 and an auxiliary circuit here shown as a bridge circuit including a first branch containing a photosensitive receiver 137 and a fixed resistor 138. A second branch of the bridge circuit contains a resistor 139 which is variable by the focusing member, not shown, and a fixed resistor 140. The fixed resistor 140 is disconnected from the variable resistor 139 in response to opening of the switch 133. The bridge circuit is connected with the battery 136 in response to closing of the switches 104 and 126, i.e., when the shoe 123 accommodates the foot of a flash unit and when the release 101 is caused to leave its illustrated starting position. A diagonal branch of the bridge circuit contains the base-emitter circuit of a transistor 141 having a collector resistor 142.

The light meter 111 is connected with a photosensitive receiver 143 or with the variable resistor 139, depending on the position of the movable contact 132c in the two-way switch 132. The collector of the transistor 141 is connected with the base of an amplifier transistor 144. The electromagnet 119 is connected in the collector circuit of the transistor 144. The emitter and the collector of the transistor 144 can be shunted by the switch 131; when the switch 131 is closed, the electromagnet 119 is connected in series with the battery 136 in response to closing of the switch 104.

An advantage of the just-described circuit arrangement is that the prevailing scene brightness, determined by the photosensitive receiver 137, can be directly compared (by transistor 141) with the resistance of the variable resistor 139. The latter is adjustable by the focusing member. The bridge circuit can automatically determine which of the two aperture sizes is smaller, namely, the aperture size which is a function of the resistance of the receiver 137 (dependency on scene brightness) or the aperture size determined by the resistor 139 in dependency on the position of the focusing member. The switch 126 shown in FIG. 6 is open; therefore, the circuit is assumed to be ready for making an exposure without artificial illumination of the subject. The photosensitive receiver 143 is in series with the light meter 111 because the movable contact 132c of the two-way switch 132 engages the fixed contact 132a. The camera can make an exposure with automatic selection of aperture size and exposure time. The aperture size is determined by the setting member 114 in a manner well known from the art. The exposure is made upon depression of the release 101 whereby the scanning member 106 determines the angular position of the setting member 114 to fix the appropriate exposure time (via lever 116) and aperture size (via setting member 114). The shutter can be released when the release 101 reaches its lower end position.

If the user wishes to make an exposure with artificial illumination of the subject, the foot of a flash unit (not shown) is introduced into the shoe 123 whereby the plunger 124 closes the switch 126. When the release 101 is thereupon depressed to close the switch 104, the bridge circuit is connected with the battery 136. If the intensity of scene light is rather high, i.e., if the resistance of the photosensitive receiver 137 is low, the condition of the transistor 141 does not change and the electromagnet 119 remains deenergized. Thus, the photosensitive receiver 143 remains connected with the light meter 111 and the shutter is adjusted as a function of the position of the scanning member 106 when the latter's face 109 engages the needle 110. The flash unit produces artificial light which serves for additional illumination of the subject.

However, when the scene brightness is such that the aperture size determined by the resistance of the resistor 139 as a function of the position of the focusing member is smaller than the aperture size determined by the resistance of the photosensitive receiver 137, the bridge circuit causes the transistor 141 to change its condition and to effect energization of the electromagnet 119 by way of the amplifier transistor 144. The blocking lever 120 then holds the follower 118 so as that the shutter unit furnishes an optimum exposure time for operation with flash. The blocking lever 120 also displaces the push rod 130 to effect opening of the switch 133 and to thus disconnect the fixed resistor 140 from the variable resistor 139. The movable contact 132c of the two-way switch 132 engages the fixed contact 132b so that the photosensitive receiver 143 is disconnected from the light meter 111 and the latter is connected with the variable resistor 139. Opening of the switch 133 would affect the balance of the bridge circuit and would therefore cause deenergization of the electromagnet 119. This is prevented by the switch 131 which is closed simultaneously with opening of the switch 133 so that the electromagnet 119 is then connected directly with the battery 136 and remains energized as long at the release 101 is held against return movement to the illustrated starting position, i.e., as long as the switch 104 remains closed.

Without further analysis, the foregoing will so fully reveal the gist of the present invention that other can, by applying current knowledge, readily adapt it for various applications without omitting features which fairly constitute essential characteristics of the generic and specific aspects of my contribution to the art.

What is claimed as new and desired to be protected by Letters Patent is set forth in the appended:

1. In a photographic apparatus for use in daylight and artificial light, a combination comprising adjustable diaphragm and shutter units; light meter means having output means movable between a plurality of positions; adjusting means providing an operative connection between said light meter means and at least one of said units to adjust the latter as a function of the position of said output means; variable resistor means having a resistance indicative of the guide number of the source of artificial light which is to be used with the apparatus; focusing means movable between a plurality of positions each of which is indicative of a different distance from the subject and arranged to adjust said resistor means as a function of the selected position thereof so that the resistance of the thus adjusted resistor means is indicative of the position of said focusing means and of said guide number; and an electric circuit arrangement including said light meter means and further including photosensitive receiver means in circuit with said light meter means to determine the position of said output means as a function of the intensity of scene light, at least when the apparatus is used in daylight, said arrangement further including an auxiliary circuit having switchover means operable to move from a first to a second position in which said resistor means is respectively disconnected from and in circuit with said light meter means and operating means for automatically operating said switchover means at least when the intensity of scene light is below a predetermined value so that said resistor means then influences the position of said output means, said operating means comprising electromagnet means which undergoes a change in the condition thereof when the intensity of scene light is below said predetermined value to thereby operate said switchover means.

2. A combination as defined in claim 1, wherein said auxiliary circuit further comprises blocking means operative to adjust said shutter unit so that the latter furnishes a predetermined exposure time when the intensity of scene light is below said predetermined value.

3. A combination as defined in claim 1, wherein said auxiliary circuit further includes a switching circuit for said operating means.

4. A combination as defined in claim 1, wherein said switchover means comprises at least one electric switch.

5. A combination as defined in claim 1, wherein said arrangement further comprises a pair of normally open series-connected switches arranged to complete said auxiliary circuit in response to closing thereof, and further comprising a source of artificial light movable to an operative position to thereby close one of said switches and camera release means movable from a starting position to thereby close the other of said switches.

6. In a photographic apparatus for use in daylight and artificial light, a combination comprising adjustable diaphragm and shutter units; light meter means having output means movable between a plurality of positions; adjusting means providing an operative connection between said light meter means and at least one of said units to adjust the latter as a function of the position of said output means; variable resistor means; focusing means movable between a plurality of positions each of which is indicative of a different distance from the subject and arranged to adjust said resistor means as a function of the selected position thereof; and an electric circuit arrangement including said light meter means and further including first photosensitive receiver means in circuit with said light meter means to determine the position of said output means as a function of the intensity of scene light, at least when the apparatus is used in daylight, said arrangement further including an auxiliary circuit having switchover means operable to move from a first to a second position in which said resistor means is respectively disconnected from and in circuit with said light meter means and operating means for operating said switchover means at least when the intensity of scene light is below a predetermined value so that said resistor means then influences the position of said output means, said operating means including second photosensitive receiver means and said focusing means comprising masking means operative to determine the extent of exposure of said second receiver means to scene light as a function of the position of said focusing means.

7. In a photographic apparatus for use in daylight and artificial light, a combination comprising adjustable diaphragm and shutter units; light meter means having output means movable between a plurality of positions; adjusting means providing an operative connection between said light meter means and at least one of said units to adjust the latter as a function of the position of said output means; variable resistor means; focusing means movable between a plurality of positions each of which is indicative of a different distance from the subject and arranged to adjust said resistor means as a function of the selected position thereof; and an electric circuit arrangement including said light meter means and further including photosensitive receiver means in circuit with said light meter means to determine the position of said output means as a function of the intensity of scene light, at least when the apparatus is used in daylight, said arrangement further including an auxiliary circuit having switchover means operable to move from a first to a second position in which said resistor means is respectively disconnected from and in circuit with said light meter means and operating means for operating said switchover means at least when the intensity of scene light is below a predetermined value so that said resistor means then influences the position of said output means, said operating means comprising electromagnet means whose condition of energization changes when the intensity of scene light is below said predetermined value and blocking means actuated by said electromagnet means in response to said change in the condition of said electromagnet means to thereby adjust said shutter unit for a predetermined exposure time.

8. In a photographic apparatus for use in daylight and artificial light, a combination comprising adjustable diaphragm and shutter units; light meter means having output means movable between a plurality of positions; adjusting means providing an operative connection between said light meter means and at least one of said units to adjust the latter as a function of the position of said output means; variable resistor means; focusing means movable between a plurality of positions each of which is indicative of a different distance from the subject and arranged to adjust said resistor means as a function of the selected position thereof; and an electric circuit arrangement including said light meter means and further including first photosensitive receiver means in circuit with said light meter means to determine the position of said output means as a function of the intensity of scene light, at least when the apparatus is used in daylight, said arrangement further including an auxiliary circuit having switchover means operable to move from a first to a second position in which said resistor means is respectively disconnected from and in circuit with said light meter means, operating means for operating said switchover means at least when the intensity of scene light is below a predetermined value so that said resistor means then influences the position of said output means, and second photosensitive receiver means exposed to scene light, said operating means including means for comparing the resistance of said second receiver means with the resistance of said resistor means.

9. A combination as defined in claim 8, wherein said auxiliary circuit is a bridge circuit having a first branch including said second receiver means and a second branch including said resistor means.

10. A combination as defined in claim 9, wherein said bridge circuit further includes a diagonal branch and said comprising means includes transistor means having a base-emitter circuit in said diagonal branch.

* * * * *